US007859696B2

(12) United States Patent
Minowa

(10) Patent No.: US 7,859,696 B2
(45) Date of Patent: Dec. 28, 2010

(54) IMAGE READING APPARATUS AND IMAGE PROCESSING METHOD THEREFOR, IMAGE FORMATION APPARATUS, IMAGE PROCESSING SYSTEM AND PRINTING TIME SHORTENING METHOD THEREFOR

(75) Inventor: Kazuhiko Minowa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1382 days.

(21) Appl. No.: 11/332,171

(22) Filed: Jan. 17, 2006

(65) Prior Publication Data

US 2007/0046979 A1 Mar. 1, 2007

(30) Foreign Application Priority Data

Aug. 26, 2005 (JP) ............................. 2005-245901

(51) Int. Cl.
*G06F 3/12* (2006.01)
(52) U.S. Cl. ...................... 358/1.15; 358/1.1; 358/1.18; 715/234
(58) Field of Classification Search ................. 358/1.1, 358/1.2, 1.13, 1.15–1.18, 474; 715/234
See application file for complete search history.

(56) References Cited

U.S. PATENT DOCUMENTS

| | | | | |
|---|---|---|---|---|
| 5,809,218 | A * | 9/1998 | Kastenholz et al. | 358/1.16 |
| 6,262,806 | B1 * | 7/2001 | Hughes | 358/1.15 |
| 6,336,124 | B1 * | 1/2002 | Alam et al. | 715/205 |
| 6,407,821 | B1 * | 6/2002 | Hohensee et al. | 358/1.15 |
| 6,538,760 | B1 * | 3/2003 | deBry et al. | 358/1.15 |
| 7,072,055 | B1 * | 7/2006 | Carter et al. | 358/1.15 |
| 7,330,284 | B2 * | 2/2008 | Someno et al. | 358/1.15 |
| 7,333,222 | B2 * | 2/2008 | Someno et al. | 358/1.15 |
| 7,573,594 | B2 * | 8/2009 | Leslie et al. | 358/1.15 |
| 2002/0046225 | A1 * | 4/2002 | Sugahara | 707/527 |
| 2002/0051179 | A1 * | 5/2002 | Someno et al. | 358/1.15 |
| 2004/0098410 | A1 * | 5/2004 | Ozawa | 707/104.1 |
| 2004/0105104 | A1 * | 6/2004 | Ishikawa et al. | 358/1.6 |
| 2004/0143794 | A1 * | 7/2004 | Sugimoto et al. | 715/526 |
| 2004/0257390 | A1 * | 12/2004 | Ito et al. | 347/5 |

(Continued)

FOREIGN PATENT DOCUMENTS

EP 1 545 117 A2 6/2005

(Continued)

OTHER PUBLICATIONS

Office Action issued in JP Application No. 2005-245901 on Mar. 16, 2010 (with English translation).

(Continued)

*Primary Examiner*—Kimberly A Williams
(74) *Attorney, Agent, or Firm*—Oliff & Berridge, PLC

(57) ABSTRACT

An image reading apparatus connected, through a communication interface, with an image formation apparatus that carries out image formation of a document file in a form of a prescribed format, which includes: a reading section that reads originals, and generates image data for each original; a document file generation section that generates the document file including image data generated from one sheet of original in the reading section; and an output section that outputs the document file generated in the document file generation section to the image formation apparatus through the communication interface.

16 Claims, 7 Drawing Sheets

U.S. PATENT DOCUMENTS

| | | | |
|---|---|---|---|
| 2005/0134941 A1 | 6/2005 | Fukuda et al. | |
| 2005/0190397 A1* | 9/2005 | Ferlitsch | 358/1.15 |
| 2005/0203919 A1* | 9/2005 | Deutsch et al. | 707/100 |
| 2005/0280837 A1* | 12/2005 | Ono et al. | 358/1.1 |
| 2006/0074849 A1* | 4/2006 | Lee | 707/1 |
| 2006/0153615 A1* | 7/2006 | Kamei | 400/62 |
| 2006/0290993 A1* | 12/2006 | Suzuki et al. | 358/1.15 |
| 2007/0070403 A1* | 3/2007 | Toda et al. | 358/1.15 |
| 2007/0070413 A1* | 3/2007 | Someno et al. | 358/1.15 |
| 2009/0015863 A1* | 1/2009 | Ozawa | 358/1.15 |
| 2009/0147313 A1* | 6/2009 | Miyagi et al. | 358/2.1 |

FOREIGN PATENT DOCUMENTS

| | | |
|---|---|---|
| JP | 2000-324282 | 11/2000 |
| JP | A 2003-084940 | 3/2003 |
| JP | 3468240 | 9/2003 |
| JP | 2004-202754 | 7/2004 |
| JP | A 2004-202754 | 7/2004 |
| JP | 2004-348498 | 12/2004 |
| JP | 2004-348622 | 12/2004 |
| JP | 2005-184376 | 7/2005 |

OTHER PUBLICATIONS

"TIFF Revision 6.0." U.S. Adobe Systems Incorporated. Jun. 3, 1992. pp. 1-121. www.http://partners.adobe.com/public/developer/cn/tiff/TIFF6.pdf.

"Adobe Portable Document Format." PDF Reference fifth edition.. U.S. Adobe Systems Incorporated. Dec. 2004. pp. 939-973. www. http://partners.adobe.com/public/developer/en/pdf/PDFReference16.pdf.

* cited by examiner

IMAGE READING APPARATUS AND IMAGE PROCESSING METHOD THEREFOR, IMAGE FORMATION APPARATUS, IMAGE PROCESSING SYSTEM AND PRINTING TIME SHORTENING METHOD THEREFOR

BACKGROUND OF THE INVENTION

1. Field of the Invention

The present invention relates to an image reading apparatus and an image processing method therefor, an image formation apparatus, an image processing system and a printing time shortening method therefor, and particularly, to an image reading apparatus and an image processing method therefor, an image formation apparatus, an image processing system and a printing time shortening method therefor which shorten the FCOT for direct printing in a P2P-connecting scanner printer system.

2. Description of the Related Art

In recent years, a system that connects a plurality of image processing apparatuses, such as a scanner, a printer, and the like, has been proposed. Such a system often adopts the LAN (Local Area Network) as an interface that connects individual image processing apparatuses. This is because the LAN interface can physically and logically utilize the general-purpose technology, and can be a loosely coupled one, which allows the independence of the individual image processing apparatuses to be enhanced.

However, with such a system, the entire system becomes extensive, thus there occurs a problem that the system introduction cost and the maintenance cost are increased.

Then, recently, a scanner printer system that P2P connects the scanner and the printer with an interface that is loosely coupled for both software and hardware has been proposed. One of the advantages of this scanner printer system is, for example, a flexibility that allows a scanner and a printer to be freely combined to configure a system.

However, there has been a demand that, if possible, the printer be not provided with either a software special mechanism or a hardware one only for connecting a scanner (in other words, that this system be configured with a general-purpose printer). Then, in the present situation, because a printer which is capable of direct printing a PDF (Portable Document Format) file not through the driver is available, the method with which image data read by the scanner (hereafter referred to as the scanned image) is converted into a PDF file by the scanner to be outputted to the printer (this method is hereafter referred to as Scan to Print one) has been adopted, and such scanner printer system has been made possible to be utilized as an alternative to a copying machine.

However, the first page of a PDF file cannot be printed out unless the PDF file is read to the last, due to the structure of the file format, thus a problem that the FCOT (First Copy Output Time) is extremely long has been presented.

Then, to solve this problem, for example, an image formation apparatus and program which sequentially stores the objects included in the PDF file, and when it is determined that all the objects constituting a prescribed page have been stored, the prescribed page is subjected to printing processing is available (as disclosed in Japanese Patent Application Laid-Open 2004-202754, for example).

In addition, for example, a file structure changing method for PDF file with which, by disposing the definition section of the indirect object in the body portion of a PDF file at the head, and thereafter, disposing the reference section of the indirect object in the body portion, interpretation can be performed from the head of the file, which eliminates the need for using a spool device, is available (as disclosed in Japanese Patent Application Laid-Open 2003-84940, for example).

However, with the art as disclosed in Japanese Patent Application Laid-Open 2004-202754, the printing processing cannot be started until all the objects constituting the prescribed page are stored, thus the FCOT cannot always be shortened, and with the art as disclosed in Japanese Patent Application Laid-Open No. 2003-84940, the file structure of a PDF file which has been once generated is restructured, thus the FCOT becomes still longer, and in addition, the scanner in the scanner printer system is required to have a storage area with a large capacity.

SUMMARY OF THE INVENTION

Thus, the present invention has been made in view of the above circumstances and provides image reading apparatus and image processing method therefore, image formation apparatus, image processing system and printing time shortening method therefore which can shorten the FCOT in Scan to Print operation in the scanner printer system.

An aspect of the present invention provides an image reading apparatus connected, through a communication interface, with an image formation apparatus that carries out image formation of a document file in a form of a prescribed format, which includes: a reading section that reads originals, and generates image data for each original; a document file generation section that generates the document file including image data generated from one sheet of original in the reading section; and an output section that outputs the document file generated in the document file generation section to the image formation apparatus through the communication interface.

And another aspect of the present invention provides an image reading apparatus connected, through a communication interface, with an image formation apparatus that carries out image formation of a document file in a form of a prescribed format, which includes: a reading section that reads originals, and generates image data for each original; a document file generation section that generates the document file by one on the basis of all the image data generated in the reading section; an information insertion section that, when the document file generation section generates the document file including all the image data, inserts a piece of information indicating a separation between the image data in the document file; and an output section that outputs the document file generated in the document file generation section to the image formation apparatus through the communication interface.

And another aspect of the present invention provides an image formation apparatus connected with an image reading apparatus through a communication interface, which includes: an input section that inputs a document file outputted from the image reading apparatus through the communication interface and including all image data read by the image reading apparatus in a form of a prescribed format; an information detection section that, during input of the document file by the input section, detects a piece of information inserted into the document file, and recognizes the image data disposed in the document file on the basis of the detected piece of information; and an image formation section that carries out image formation of the image data recognized in the information detection section.

And another aspect of the present invention provides an image processing system in which an image reading apparatus is connected with an image formation apparatus through a communication interface, in which the image reading apparatus includes: a reading section that reads an original, and generates image data for each original; a document file generation section that generates a document file by one in a form of a prescribed format on the basis of all the image data generated in the reading section; an information insertion section that, when the document file generation section generates the document file including all the image data, inserts a piece of information indicating a separation between image data in the document file; and an output section that outputs the document file generated in the document file generation section to the image formation apparatus through the communication interface, and; the image formation apparatus which includes an input section that inputs the document file outputted from the image reading apparatus through the communication interface; an information detection section that, during input of the document file by the input section, detects a piece of information inserted into the document file, and, on the basis of the detected piece of information, recognizes the image data disposed in the document file; and an image formation section that carries out image formation of the image data recognized in the information detection section.

And another aspect of the present invention provides an image processing method for an image reading apparatus connected, through a communication interface, with an image formation apparatus that carries out image formation of a document file in the form of a prescribed format, which includes: reading originals and generating image data for each original by a reading section; generating, by a document file generation section, the document file including image data generated from one sheet of original in the reading section; and outputting, by an output section, the document file generated in the document file generation section to the image formation apparatus through the communication interface.

And another aspect of the present invention provides a printing time shortening method for an image processing system in which an image reading apparatus is connected with an image formation apparatus through a communication interface, which includes, in the image reading apparatus, reading originals and generating image data for each original by a reading section; generating, by a document file generation section, a document file by one in a form of a prescribed format on the basis of all image data generated in the reading section; inserting, by an information insertion section, a piece of information indicating a separation between image data in the document file, when the document file generation section generates a document file including all the image data; and outputting, by an output section, the document file generated in the document file generation section to the image formation apparatus through the communication interface, and in the image formation apparatus, inputting, by an input section, the document file outputted from the image reading apparatus through the communication interface; detecting a piece of information inserted into the document file during input of the document file by the input section, and recognizing the image data disposed in the document file on the basis of the detected piece of information by an information detection section; and carrying out image formation of the image data recognize in the information detection section by an image formation section.

BRIEF DESCRIPTION OF THE DRAWINGS

Embodiments of the present invention will be described in detail based on the following figures, wherein.

DETAILED DESCRIPTION OF THE INVENTION

Hereinbelow, embodiments of the present invention will be described in detail with reference to the attached drawings.

Figure 1:
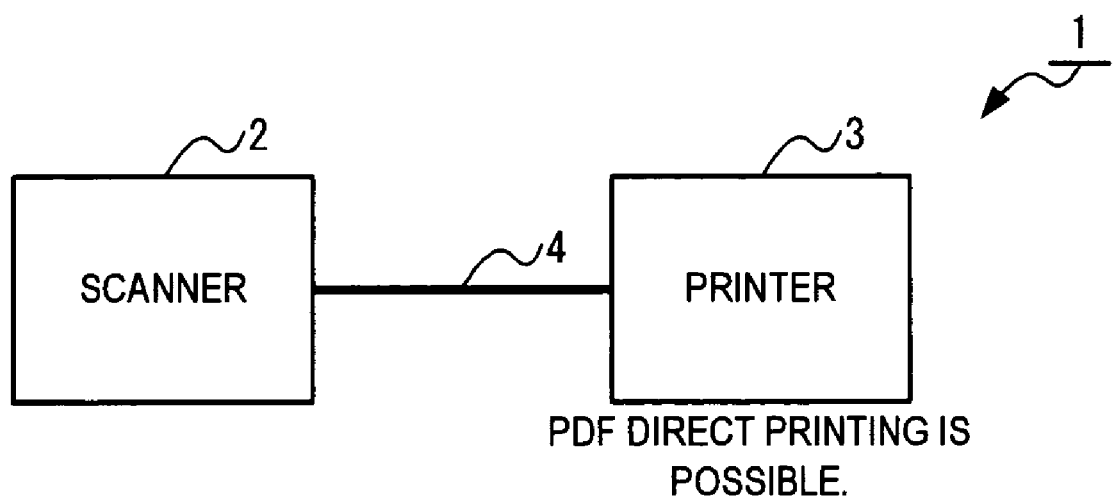
FIG. 1 is a diagram illustrating one example of the system configuration of a scanner printer system utilizing the image reading apparatus and the image formation apparatus pertaining to the present invention.

FIG. 1 is a diagram illustrating one example of the system configuration of a scanner printer system 1 utilizing the image reading apparatus and the image formation apparatus pertaining to the present invention.

As shown in FIG. 1, the scanner printer system 1 is configured by connecting a scanner 2 and a printer 3 through a USB cable 4 having a USB (Universal Serial Bus) specification interface, or the like. The interface connecting the scanner 2 and the printer 3 need not be limited to the USB specification interface, and a wired channel, such as the IEEE (the Institute of Electrical and Electronic Engineers) 1394 cable, the LAN cable, the RS-232C cable, or the like, and a wireless channel, such as the wireless LAN, the IrDA (Infrared Data Association) infrared communication channel, or the like, may be used for connection.

The printer 3 is capable of direct printing a PDF file received not through the driver.

Example 1

As EXAMPLE 1, a scheme that generates a single page PDF file for one scanned image, and outputs it to the printer 3 will be described.

Figure 2:
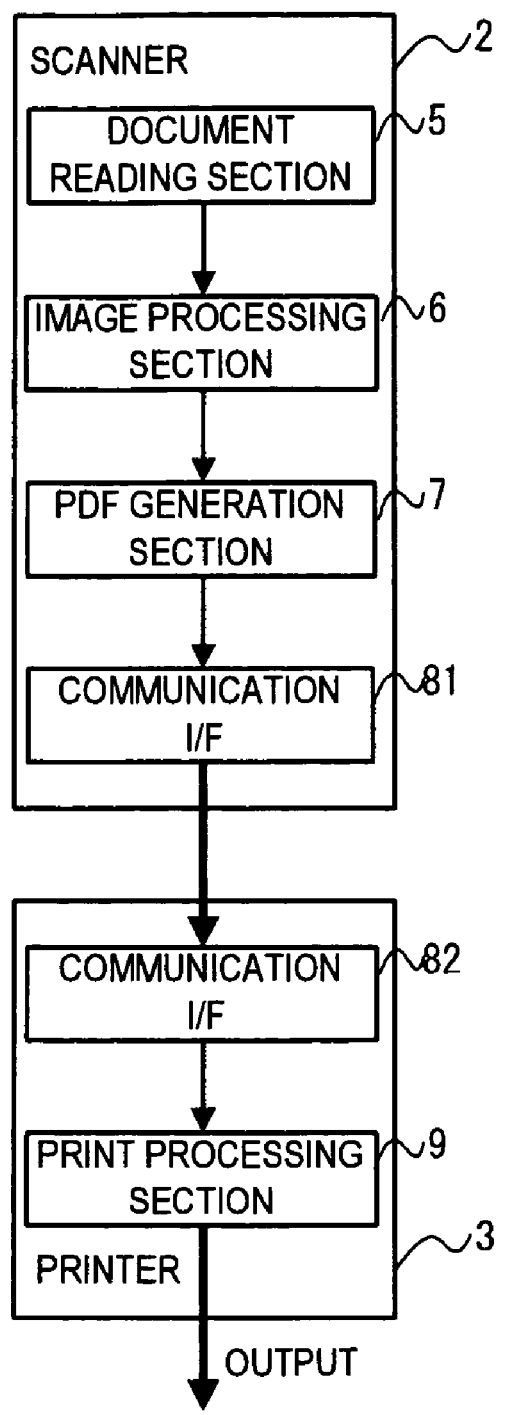
FIG. 2 is a block diagram illustrating one example of the functional scheme of the scanner 2 and the printer 3 as shown in FIG. 1.

FIG. 2 is a block diagram illustrating one example of the functional scheme of the scanner 2 and the printer 3 as shown in FIG. 1.

As shown in FIG. 2, the scanner 2 is configured to comprise a document reading section 5, an image processing section 6, a PDF generation section 7, and a communication I/F 81.

The document reading section 5 reads a original for carrying out a processing to generate a scanned image, being composed of an image sensor, such as a CCD (Charge Coupled Device), or the like, a motor which moves the carriage loaded with the image sensor, or the original, and the like. The document reading section 5 generates one scanned image (which is referred to as a scanned image for one page) every time one sheet of original is read. In other words, with n sheets of original being read by the document reading section 5, scanned images for n pages are generated.

The image processing section 6 carries out an image processing (for example, an enlargement processing, a reduction processing, or the like) on the scanned image generated by the document reading section 5, being made up by operating the processor with software, or being composed of an IC (Integrated Circuit) for image processing, and the like.

The PDF generation section 7 carries out a processing for generating a single page PDF file on the basis of the scanned image for one page generated by the document reading section 5.

The communication I/F 81 provides an interface for data communication that is connectable with the printer 3, and the scanner 2 outputs the single page PDF file to the printer 3 through the communication I/F 81.

As shown in FIG. 2, the printer 3 is configured to comprise a communication I/F 82, and a print processing section 9.

The communication I/F 82 provides an interface for data communication that is connectable with the scanner 2, and the printer 3 receives the single page PDF file from the scanner 2 through the communication I/F 82.

The print processing section 9 carries out a print processing for the scanned image included in the single page PDF file at the time when the input of the single page PDF file has been completed.

Figure 3:
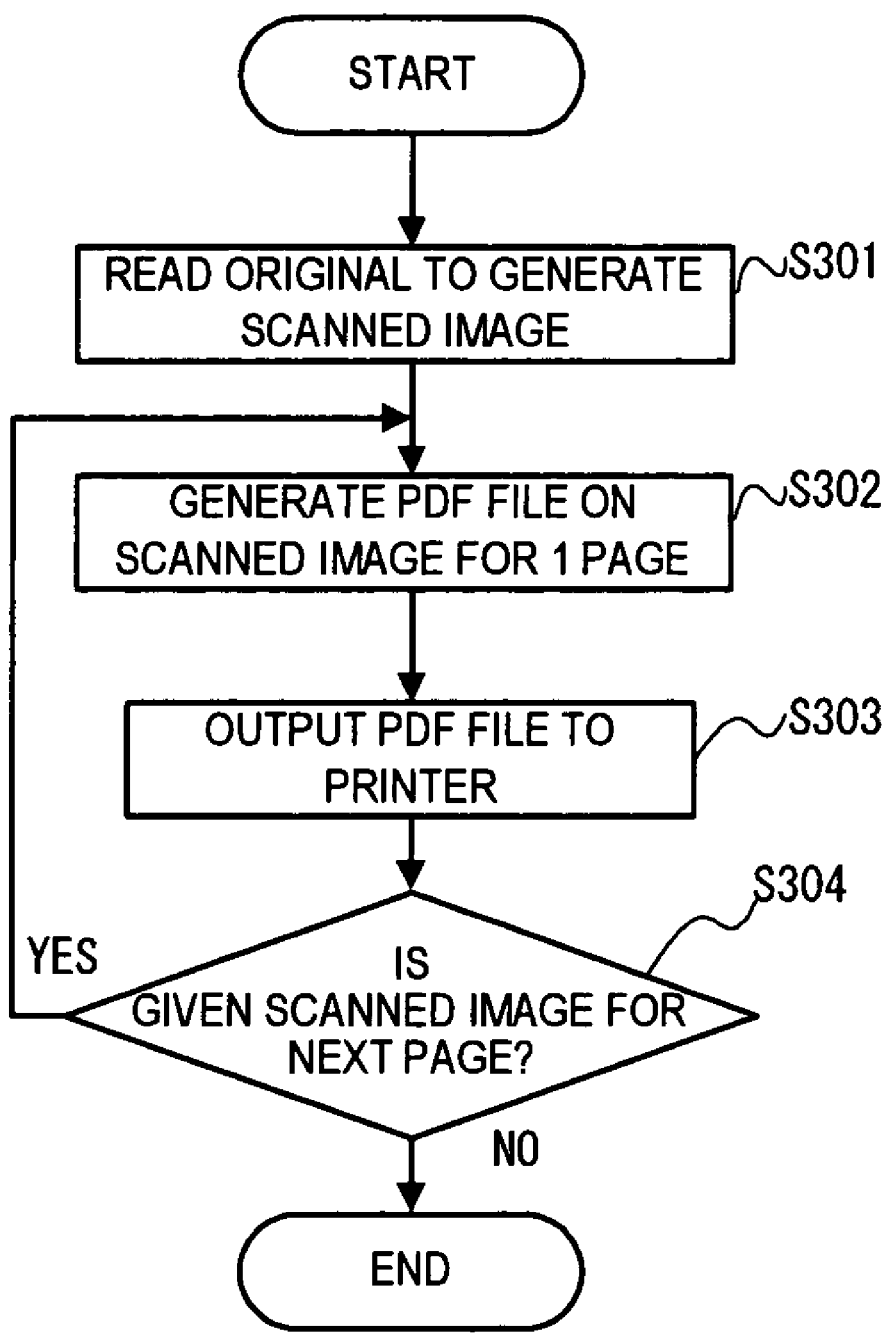
FIG. 3 is a flow chart illustrating the flow of the processing carried out by the scanner when a Scan to Print operation is performed in the scanner printer system.

Next, the flow of the processing carried out by the scanner when a Scan to Print operation is performed in the scanner printer system will be described with reference to the flow chart as shown in FIG. 3.

The document reading section reads the original to generate a scanned image (at step S301); the PDF generation section generates a single page PDF file on the basis of the scanned image for one page (at step S302); outputs the generated single page PDF file to the printer through the communication I/F (at step S303); and if the scanned image for the next page is given (YES at step S304), the program is returned to the step S302.

When no scanned image for the next page is given (NO at step S304), the processing is ended.

Therefore, the scanned image for one page is outputted to the printer as a single page PDF file, thus the printer can start the print processing at the time when the input of the single page PDF file has been completed, and there is no need for waiting the print processing until the end of the file is inputted, as with the multipage PDF file, which allows the FCOT to be shortened.

For the printer 3, a scanner printer system can be constructed using a general-purpose printer that is capable of direct printing a PDF file.

Example 2

As EXAMPLE 2, a scheme that generates one PDF file including a plurality of scanned images, and outputs it to the printer 3 will be described.

Figure 4:
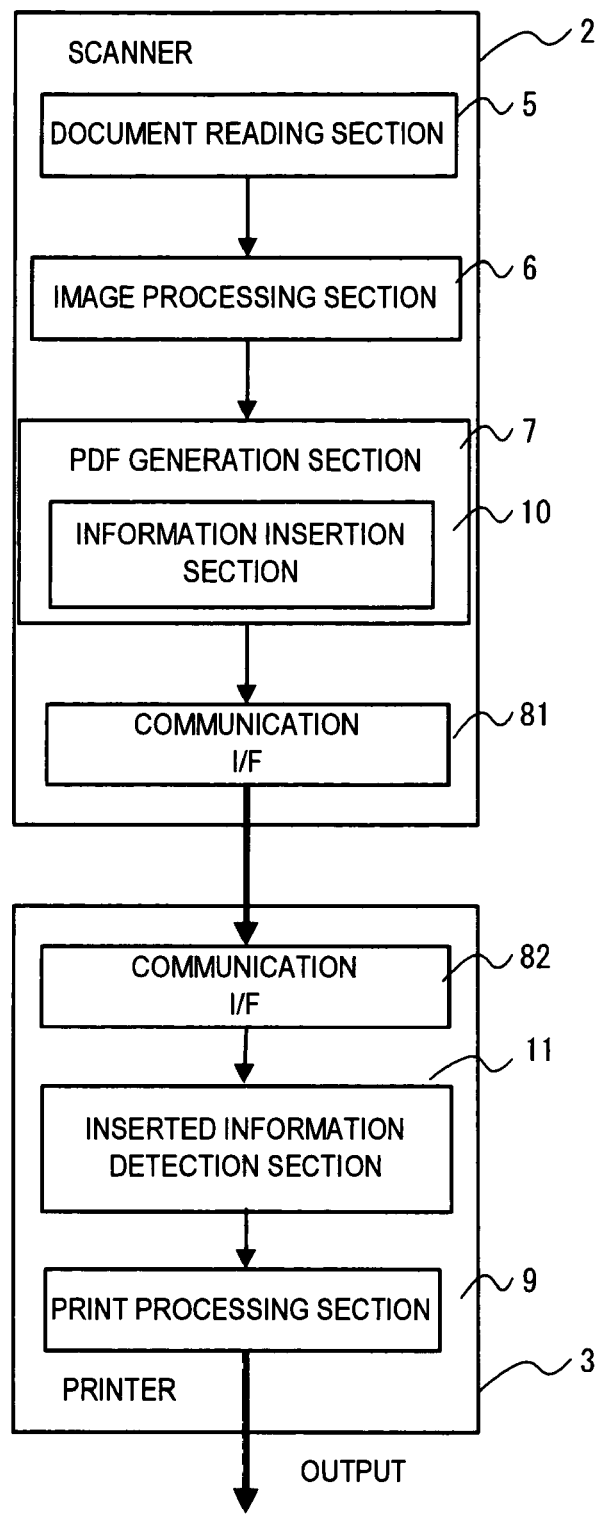
FIG. 4 is a block diagram illustrating one example of the functional scheme of the scanner 2 and the printer 3 as shown in FIG. 1.

FIG. 4 is a block diagram illustrating another example of the functional scheme of the scanner 2 and the printer 3 as shown in FIG. 1.

As shown in FIG. 4, the scanner 2 is configured to comprise a document reading section 5, an image processing section 6, a PDF generation section 7, and a communication I/F 81.

The document reading section 5 reads a original for carrying out a processing to generate a scanned image, being composed of an image sensor, such as a CCD, or the like, a motor which moves the carriage loaded with the image sensor, or the original, and the like. The document reading section 5 generates one scanned image (which is referred to as a scanned image for one page) every time one sheet of original is read. In other words, with n sheets of original being read by the document reading section 5, scanned images for n pages are generated.

The image processing section 6 carries out an image processing (for example, an enlargement processing, a reduction processing, or the like) on the scanned image generated by the document reading section 5, being made up by operating the processor with software, or being composed of an IC for image processing, and the like.

The PDF generation section 7 carries out a processing for generating a PDF file including all scanned images (i.e., a multipage PDF file) generated by the document reading section 5. In generating a PDF file, an information insertion section 10 carries out processings of inserting a piece of information indicating the start of the page (which is hereafter referred to as the header for starting the nth page) at the beginning of the page object for the scanned image on the respective pages in the PDF file, and inserting a piece of information indicating the end of the page (which is hereafter referred to as the footer for ending the nth page) at the tail of the page object.

The communication I/F 81 provides an interface for data communication that is connectable with the printer 3, and the scanner 2 outputs the PDF file to the printer 3 through the communication I/F 81.

As shown in FIG. 4, the printer 3 is configured to comprise a communication I/F 82, an inserted information detection section 11, and a print processing section 9.

The communication I/F 82 provides an interface for data communication that is connectable with the scanner 2, and the printer 3 receives the PDF file from the scanner 2 through the communication I/F 82.

The inserted information detection section 11 detects the header for starting the nth page and the footer for ending the nth page which are inserted in the received PDF file, and transfers the page object including the scanned image on the nth page that exists between the header for starting the nth page and the footer for ending the nth page to the print processing section 9.

The print processing section 9 carries out a print processing of the scanned image included in the page object in the PDF file.

Next, about insertion of the header for starting the nth page and the footer for ending the nth page into the PDF file that is carried out by the information insertion section 10 in the scanner 2 will be described with reference to FIG. 5 A and FIG. 5B.

Figures 5A, 5B:
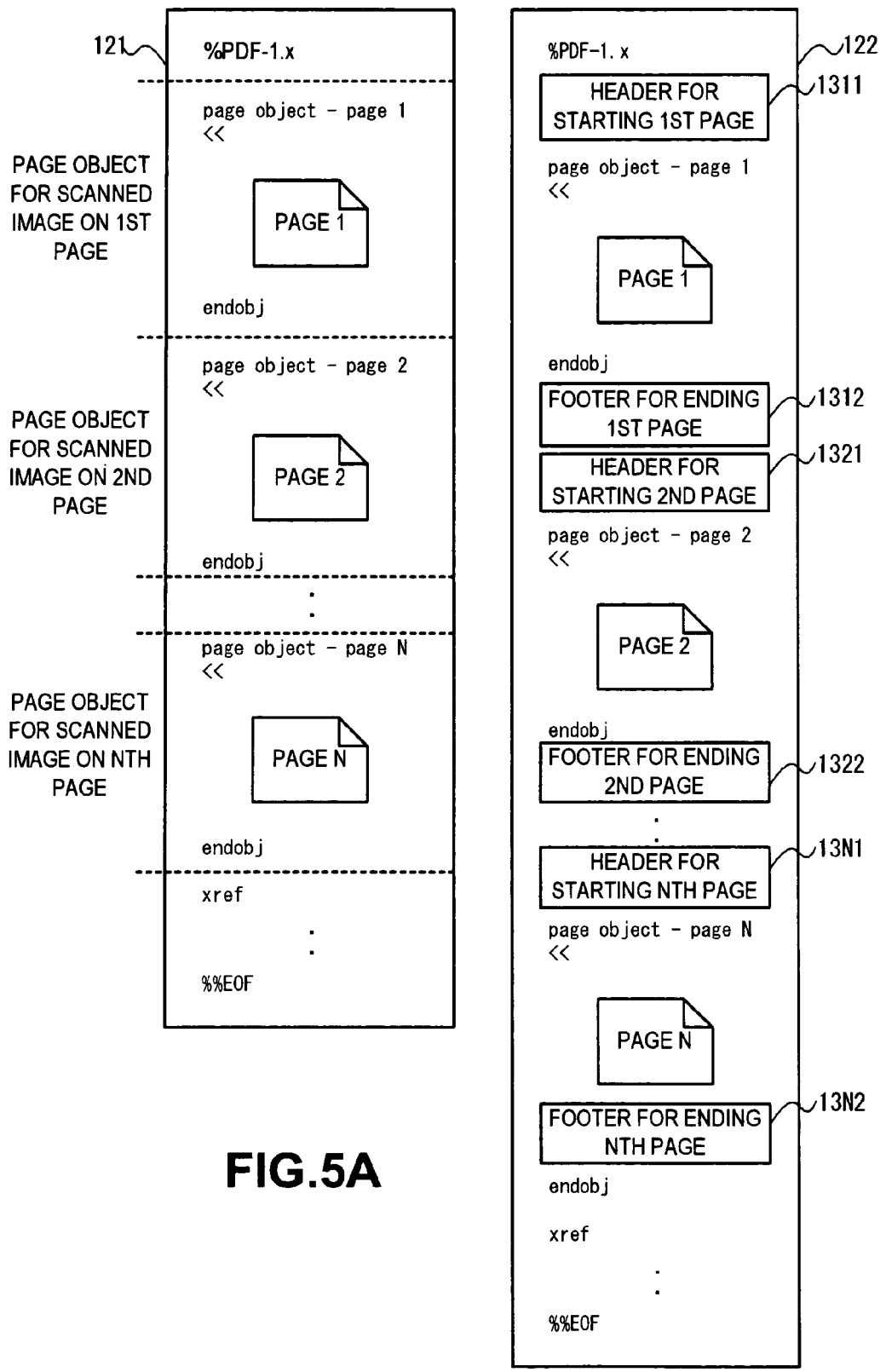
FIG. 5A and FIG. 5B are drawings illustrating the insertion of the header for starting the nth page and the footer for ending the nth page into the PDF file that is carried out by the information insertion section of the scanner.

FIG. 5A is a drawing illustrating one example of the file structure of a PDF file 121 including N scanned images generated by the PDF generation section 7.

First, at the beginning of the PDF file 121, a comment of % PDF-1.x is written; next, the page object for the scanned image on the 1st page is disposed; next, the page object for the scanned image on the 2nd page is disposed; thereafter, the 3rd page, the 4th page, . . . follow; then the page object for the scanned image on the Nth page, the final one, is disposed; and at the tail of the PDF file 121, a prescribed comment is written, the PDF file ending.

In other words, the PDF generation section 7 adds a read scanned image to the PDF file 121 each time while generating the PDF file 121, thus the page objects for the scanned images in the PDF file 121 are arranged in the order of page, the generated PDF file 121 providing a simple file structure.

FIG. 5B is a drawing illustrating one example of the file structure of a PDF file 122 into which the header for starting the nth page and the footer for ending the nth page have been inserted by the information insertion section.

As shown in FIG. 5B, before the page object including the scanned image on the 1st page, a header for starting the 1st page 1311 is written, and after that object, a footer for ending the 1st page 1312 is written; next, before the page object including the scanned image on the 2nd page, a header for starting the 2nd page 1321 is written, and after that object, a footer for ending the 2nd page 1322 is written; thereafter, the 3rd page, the 4th page, . . . follow; then before the page object including the scanned image on the Nth page, the final one, a header for starting the Nth page 13N1 is written, and after that object, a footer for ending the Nth page 13N2 is written.

Therefore, by detecting the header for starting the nth page, it can be recognized that the page object existing subsequently to the header is for the scanned image on the nth page, and thereafter, by detecting the footer for ending the nth page, it can be recognized that the page object including the scanned image on the nth page has been ended, thus even if the PDF file is not inputted to the last, the page object including the scanned image on the nth page can be completely recognized, which allows print processing of the scanned image on the nth page to be carried out without problems.

Figure 6:
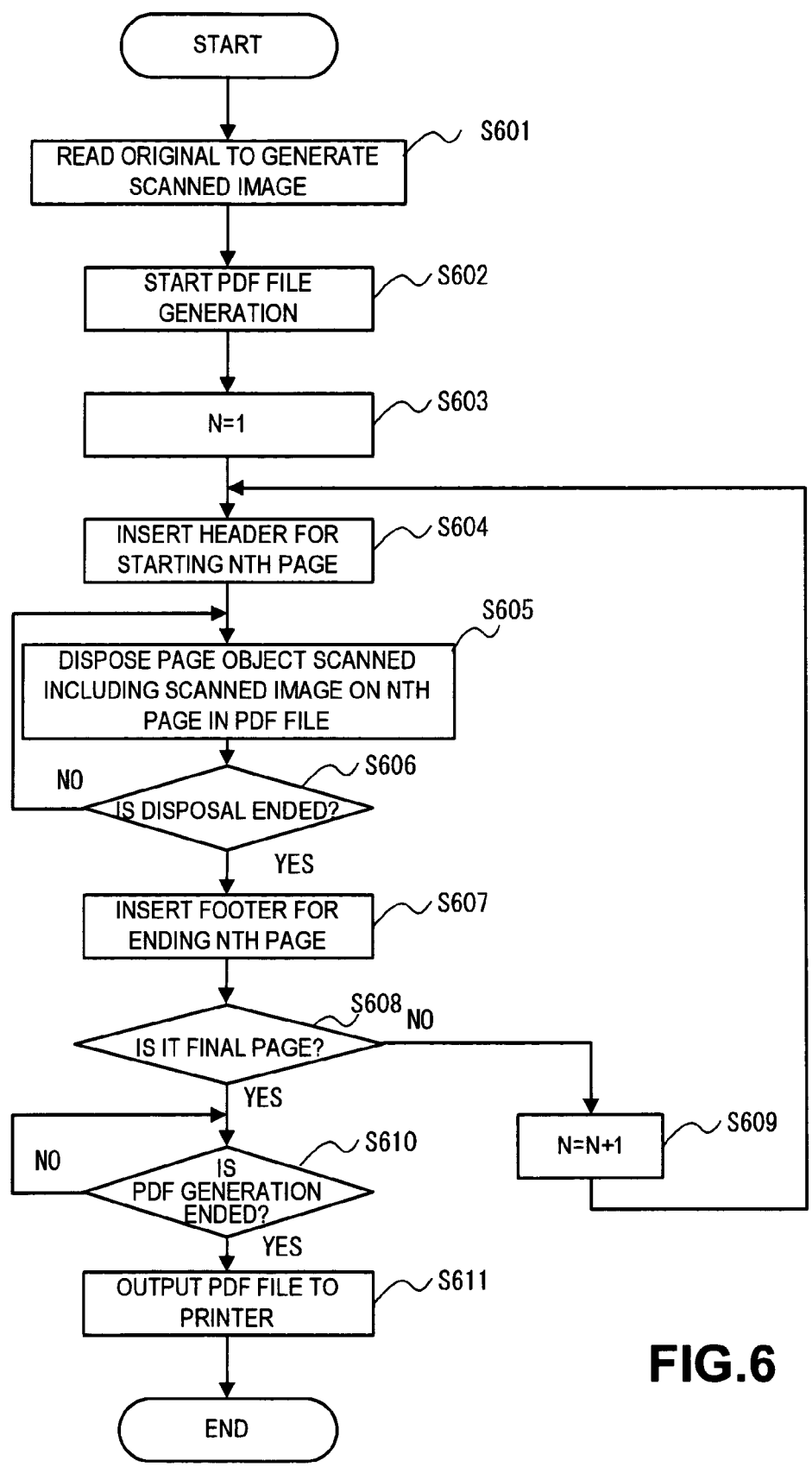
FIG. 6 is a flow chart illustrating the flow of the processing carried out by the scanner when a Scan to Print operation is performed in the scanner printer system.

Next, the flow of the processing carried out by the scanner when a Scan to Print operation is performed in the scanner printer system will be described with reference to the flow chart as shown in FIG. 6.

The document reading section reads the original to generate a scanned image (at step S601), and the PDF generation section starts generating a PDF file on the basis of the scanned image (at step S602).

Herein, the PDF generation section sets the n indicating the page number for the scanned image to 1 (at step S603); the information insertion section inserts the header for starting the nth page into the PDF file (at step S604); and the PDF generation section disposes the page object including the scanned image on the nth page after the header for starting the nth page that has been inserted into the PDF file (at step S605). Then, when the disposal of the page object including the scanned image on the nth page is ended (YES at step S606), the information insertion section inserts the footer for ending the nth page after the page object including the scanned image on the nth page that has been disposed in the PDF file (at step S607).

Then, whether the nth page is the final page is identified (at step S608); if the nth page is not the final page (NO at step S608), the program goes to the step S609, and if the nth page is the final page (YES at step S608), the program goes to the step S610.

If, at the step S608, the nth page is not the final page (NO at step S608), the n is set to n+1 (at step S610), the program is returned to the step S604.

If, at the step S608, the nth page is the final page (YES at step S608), with the generation of the PDF file being ended (YES at step S609), the generated PDF file is outputted to the printer through the communication I/F (at step S611), the processing being ended.

Figure 7:
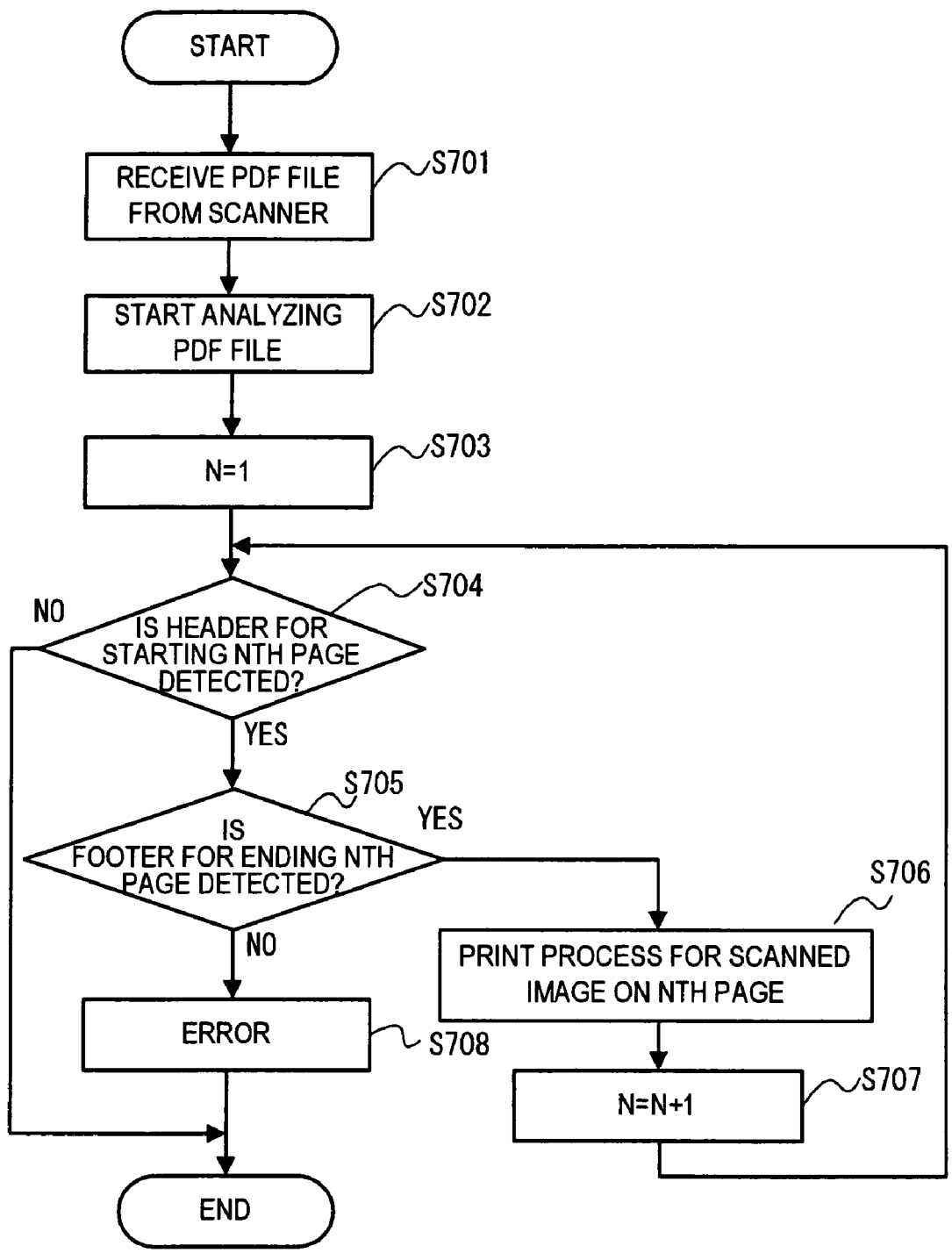
FIG. 7 is a flow chart illustrating the flow of the processing carried out by the printer when a Scan to Print operation is performed in the scanner printer system.

Next, the flow of the processing carried out by the printer when a Scan to Print operation is performed in the scanner printer system will be described with reference to the flow chart as shown in FIG. 7.

The PDF file is received from the scanner through the communication I/F (at step S701), and the inserted information detection section starts analyzing the PDF file (at step S702).

Herein, the inserted information detection section sets the n indicating the page number for the scanned image to 1 (at step S703); detects the header for starting the nth page (YES at step S704); detects the footer for ending the nth page (YES at step S705); the print processing section carries out print processing for the scanned image of the nth page configured between the header for starting the nth page and the footer for ending the nth page (at step S706); and sets the n to n+1 (at step S707), the program being returned to the step S704.

In addition, if, at the step S704, the header for starting the nth page is not detected (NO at step S704), the processing is ended.

In addition, if, at the step S705, the footer for ending the nth page is not detected (NO at step S705), it is recognized as an error of the PDF file (at step S708), the processing is ended.

In EXAMPLE 2, the scheme in which the header for starting is inserted before the page object, and the footer for ending is inserted after the page object has been described, however, a scheme in which a piece of information which indicates the separation is inserted between page objects, and the printer recognizes the page being changed over from the piece of information may be used.

As mentioned above, a first aspect of the present invention is an image reading apparatus connected, through a communication interface, with an image formation apparatus that carries out image formation of a document file in a form of a prescribed format, which includes: a reading section that reads originals, and generates image data for each original; a document file generation section that generates the document file including image data generated from one sheet of original in the reading section; and an output section that outputs the document file generated in the document file generation section to the image formation apparatus through the communication interface.

A second aspect of the present invention is an image reading apparatus connected, through a communication interface, with an image formation apparatus that carries out image formation of a document file in a form of a prescribed format, which includes: a reading section that reads originals, and generates image data for each original; a document file generation section that generates the document file by one on the basis of all the image data generated in the reading section; an information insertion section that, when the document file generation section generates the document file including all the image data, inserts a piece of information indicating a separation between the image data in the document file; and an output section that outputs the document file generated in the document file generation section to the image formation apparatus through the communication interface.

A third aspect of the present invention is the image reading apparatus according to the second aspect of the present invention in which the document file generation section may dispose an object including the image data in the document file in the order of generation in the reading section; the information insertion section may insert, before the object, a piece of information indicating a start of the object, and may insert, after the object, a piece of information indicating an end of the object.

A fourth aspect of the present invention is the image reading apparatus according to the second aspect of the present invention in which the document file generation section may dispose an object including the image data in the document file in the order of generation in the reading section; and the information insertion section may insert the piece of information between the objects.

A fifth aspect of the present invention is an image formation apparatus connected with an image reading apparatus through a communication interface, which includes: an input section that inputs a document file outputted from the image reading apparatus through the communication interface and including all image data read by the image reading apparatus in a form of a prescribed format; an information detection section that, during input of the document file by the input section, detects a piece of information inserted into the document file, and recognizes the image data disposed in the document file on the basis of the detected piece of information; and an image formation section that carries out image formation of the image data recognized in the information detection section.

A sixth aspect of the present invention is the image formation apparatus according to the fifth aspect of the present invention in which, in the document file, an object including the image data may be disposed in the order of page, a piece of information indicating the start of the object may be inserted before the object, and a piece of information indicating the end of the object may be inserted after the object, the information detection section may recognize, on the basis of the pieces of information, the object disposed between the pieces of information as an object for the image data generated from one sheet of original.

A seventh aspect of the present invention is the image formation apparatus according to the fifth aspect of the present invention in which, in the document file, an object including the image data may be disposed in the order of page, the piece of information may be inserted between the object; the information detection section may recognize, on the basis of the pieces of information, an object disposed between the piece of information as an object for the image data generated from one sheet of original.

A eighth aspect of the present invention is an image processing system in which an image reading apparatus connected with an image formation apparatus through a communication interface, in which the image reading apparatus includes: a reading section that reads an original, and generates image data for each original; a document file generation section that generates a document file by one in a form of a prescribed format on the basis of all the image data generated in the reading section; an information insertion section that, when the document file generation section generates the document file including all the image data, inserts a piece of information indicating a separation between image data in the document file; and an output section that outputs the document file generated in the document file generation section to the image formation apparatus through the communication interface, and the image formation apparatus which includes an input section that inputs the document file outputted from the image reading apparatus through the communication interface; an information detection section that, during input of the document file by the input section, detects a piece of information inserted into the document file, and, on the basis of the detected piece of information, recognizes the image data disposed in the document file; and an image formation section that carries out image formation of the image data recognized in the information detection section.

A ninth aspect of the present invention is the image processing system according to the eighth aspect of the present invention, in which the document file generation section may dispose an object including the image data in the document file in the order of generation in the reading section; the information insertion section may insert, before the object, a piece of information indicating the start of the object, and may insert, after the object, a piece of information indicating the end of the object.

A tenth aspect of the present invention is the image processing system according to the eighth aspect of the present invention, in which the document file generation section may dispose an object including the image data in the document file in the order of generation in the reading section; and the information insertion section may insert the piece of information between the object.

A eleventh aspect of the present invention is the image processing system according to the ninth and tenth aspects of the present invention, in which the information detection section may recognize, on the basis of the piece of information inserted by the information insertion section, an object disposed between the piece of information as an object for the image data generated from one sheet of original.

A twelfth aspect of the present invention is an image processing method for an image reading apparatus connected, through a communication interface, with an image formation apparatus that carries out image formation of a document file in the form of a prescribed format, which includes: reading originals and generating image data for each original by a reading section; generating, by a document file generation section, the document file including image data generated from one sheet of original in the reading section; and outputting, by an output section, the document file generated in the document file generation section to the image formation apparatus through the communication interface.

A thirteenth aspect of the present invention is a printing time shortening method for an image processing system in which an image reading apparatus is connected with an image formation apparatus through a communication interface, which includes, in the image reading apparatus, reading originals and generating image data for each original by a reading section; generating, by a document file generation section, a document file by one in a form of a prescribed format on the basis of all image data generated in the reading section; inserting, by an information insertion section, a piece of information indicating a separation between image data in the document file, when the document file generation section generates a document file including all the image data; and outputting, by an output section, the document file generated in the document file generation section to the image formation apparatus through the communication interface, and in the image formation apparatus, inputting, by an input section, the document file outputted from the image reading apparatus through the communication interface; detecting a piece of information inserted into the document file during input of the document file by the input section, and recognizing the image data disposed in the document file on the basis of the detected piece of information by an information detection section; and carrying out image formation of the image data recognize in the information detection section by an image formation section.

A fourteenth aspect of the present invention is the method according to the thirteenth aspect of the present invention, which may include disposing, by the document file generation section, an object including the image data in the document file in the order of generation in the reading section; and inserting, by the information insertion section, a piece of information indicating the start of the object before the object, and a piece of information indicating the end of the object after the object.

A fifteenth aspect of the present invention is the method according to the thirteenth aspect of the present invention, which may include disposing, by the document file generation section, an object including the image data in the document file in the order of generation in the reading section; inserting, by the information insertion section, the piece of information between the objects.

A sixteenth aspect of the present invention is according to the thirteenth and fifteenth aspects of the present invention, which may include recognizing, by the information detection section, on the basis of the piece of information inserted by the information insertion section, an object disposed between the pieces of information as an object including the image data generated from one sheet of original.

According to the present invention, the system is schemed such that, in carrying out the Scan to Print operation on a multipage PDF file, the scanner inserts the header for starting before the page object for the scanned image that has been disposed in the PDF file, and the footer for ending after that, and the printer recognizes that the image data disposed between the header for starting and the footer for ending corresponds to the original for one sheet, thus an effect that, even if the printer does not input the PDF file to the last, it can carry out print processing the recognized scan image, which results in the FCOT for the Scan to Print operation being shortened, can be provided.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-245901 filed on Aug. 26, 2005 including specification, claims, drawings and abstract is incorporated herein by reference in its entirety.

What is claimed is:

1. An image reading apparatus connected, through a communication interface, with an image formation apparatus that carries out image formation of a document file in a form of a prescribed format, comprising:
   a reading section that reads originals, and generates image data for each original;
   a document file generation section that generates the document file by one on the basis of all the image data generated in the reading section;
   an information insertion section that, when the document file generation section generates the document file including all the image data, inserts a piece of information indicating a separation between the image data in the document file and an end-of-file footer; and
   an output section that detects an end-of-file footer and performs FCOT printing and outputs the document file generated in the document file generation section to the image formation apparatus through the communication interface.

2. The image reading apparatus according to claim 1, wherein
   the document file generation section disposes an object including the image data in the document file in the order of generation in the reading section;
   the information insertion section inserts, before the object, a piece of information indicating a start of the object, and inserts, after the object, a piece of information indicating an end of the object.

3. The image reading apparatus according to claim 1, wherein
   the document file generation section disposes an object including the image data in the document file in the order of generation in the reading section;
   the information insertion section inserts the piece of information between the objects.

4. An image formation apparatus connected with an image reading apparatus through a communication interface, comprising:
   an input section that inputs a document file outputted from the image reading apparatus through the communication interface and including all image data read by the image reading apparatus in a form of a prescribed format;
   an information detection section that, during input of the document file by the input section, detects a piece of information inserted into the document file including an end-of-file footer, and recognizes the image data disposed in the document file on the basis of the detected piece of information; and
   an image formation section that carries out image formation of the image data recognized in the information detection section and performs FCOT printing.

5. The image formation apparatus according to claim 4, wherein,
   in the document file,
   an object including the image data is disposed in the order of page,
   a piece of information indicating the start of the object is inserted before the object, and a piece of information indicating the end of the object is inserted after the object,
   the information detection section recognizes, on the basis of the pieces of information, the object disposed between the pieces of information as an object for the image data generated from one sheet of original.

6. The image formation apparatus according to claim 4, wherein,
   in the document file,
   an object including the image data is disposed in the order of page,
   the piece of information is inserted between the objects;
   the information detection section recognizes, on the basis of the pieces of information, an object disposed between the pieces of information as an object for the image data generated from one sheet of original.

7. An image processing system in which an image reading apparatus is connected with an image formation apparatus through a communication interface, wherein
   the image reading apparatus comprises:
   a reading section that reads originals, and generates image data for each original;
   a document file generation section that generates a document file by one in a form of a prescribed format on the basis of all the image data generated in the reading section;
   an information insertion section that, when the document file generation section generates the document file including all the image data, inserts a piece of information indicating a separation between image data in the document file and an end-of-file footer, and
   an output section that outputs the document file generated in the document file generation section to the image formation apparatus through the communication interface, and
   the image formation apparatus comprises:
   an input section that detects an end-of-file footer and performs FCOT printing and inputs the document file outputted from the image reading apparatus through the communication interface;
   an information detection section that, during input of the document file by the input section, detects a piece of information inserted into the document file, and, on the basis of the detected piece of information, recognizes the image data disposed in the document file; and an image formation section that carries out image formation of the image data recognized in the information detection section.

8. The image processing system according to claim 7, wherein the document file generation section disposes an object including the image data in the document file in the order of generation in the reading section;

the information insertion section inserts, before the object, a piece of information indicating the start of the object, and inserts, after the object, a piece of information indicating the end of the object.

9. The image processing system according to claim 8, wherein the information detection section recognizes, on the basis of the piece of information inserted by the information insertion section, an object disposed between the pieces of information as an object for the image data generated from one sheet of original.

10. The image processing system according to claim 7, wherein the document file generation section disposes an object including the image data in the document file in the order of generation in the reading section;

the information insertion section inserts the piece of information between the objects.

11. The image processing system according to claim 10, wherein the information detection section recognizes, on the basis of the piece of information inserted by the information insertion section, an object disposed between the pieces of information as an object for the image data generated from one sheet of original.

12. A printing time shortening method for an image processing system in which an image reading apparatus connects with an image formation apparatus through a communication interface, comprising:

in the image reading apparatus, reading originals and generating image data for each original by a reading section;

generating, by a document file generation section, a document file by one in a form of a prescribed format on the basis of all image data generated in the reading section;

inserting, by an information insertion section, a piece of information indicating a separation between image data in the document file and an end-of-file footer, when the document file generation section generates a document file including all the image data; and outputting, by an output section, that detects an end-of-file footer and performs FCOT printing and the document file generated in the document file generation section to the image formation apparatus through the communication interface, and in the image formation apparatus, inputting, by an input section, the document file outputted from the image reading apparatus through the communication interface;

detecting a piece of information inserted into the document file during input of the document file by the input section, and recognizing the image data disposed in the document file on the basis of the detected piece of information by an information detection section; and carrying out, by an image formation section, image formation of the image data recognize in the information detection section.

13. The method according to claim 12, further comprising:

disposing, by the document file generation section, an object including the image data in the document file in the order of generation in the reading section;

inserting, by the information insertion section, a piece of information indicating the start of the object before the object, and a piece of information indicating the end of the object after the object.

14. The method, according to claim 13, further comprising:

recognizing, by the information detection section, on the basis of the piece of information inserted by the information insertion section, an object disposed between the pieces of information as an object including the image data generated from one sheet of original.

15. The method according to claim 12, further comprising:

disposing, by the document file generation section, an object including the image data in the document file in the order of generation in the reading section;

inserting, by the information insertion section, the piece of information between the objects.

16. The method, according to claim 15, further comprising:

recognizing, by the information detection section, on the basis of the piece of information inserted by the information insertion section, an object disposed between the pieces of information as an object including the image data generated from one sheet of original.

* * * * *